United States Patent Office 3,408,337
Patented Oct. 29, 1968

3,408,337
PROCESS FOR REMOVAL OF CROSS-
LINKING AGENT FROM A THERMO-
SET-THERMOPLASTIC
Eugene R. Moore, Midland, Mich., assignor to The Dow
Chemical Company, Midland, Mich., a corporation of
Delaware
No Drawing. Filed Feb. 5, 1964, Ser. No. 342,797
6 Claims. (Cl. 260—78.5)

ABSTRACT OF THE DISCLOSURE

Removal of crosslinking agent from a polyol crosslinked polymer by heating at elevated temperatures and reduced pressures.

This invention relates to a process for removing crosslinking agents from resinous materials, and is more particularly concerned with removing crosslinking agents from resinous products of the reaction of unsaturated dibasic acid anhydrides and olefins which have been crosslinked with polyols.

In all types of forming operations upon synthetic resinous materials there is a certain amount of scrap produced. When thermosetting resins are processed, this scrap cannot be reused. This invention provides for the reuse of such scrap, by reconverting it to its uncrosslinked form, whereby it becomes soluble and thermoplastic and can again be processed and modified as desired.

In accordance with this invention, the reaction products of unsaturated dibasic acid anhydride and olefins which have been crosslinked with polyols may be converted to uncrosslinked materials by the proper application of heat under reduced pressure, preferably with mixing, whereby the crosslinking is reversed and the crosslinking agent is removed from the resinous product.

Solid polymer or resin ingredients used with the present invention may be any of the products of reaction of unsaturated dibasic acid anhydrides and olefins. Useful unsaturated dibasic acid anhydrides are such as maleic anhydride, chlormaleic anhydride, citraconic acid anhydride and the like. The preferred form of anhydride has the general formula

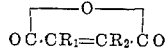

where $R_1$ represents a hydrogen atom or halogen atom or a hydrocarbon radical which may or may not be substituted by halogen, oxygen, nitrogen, etc. atoms, and $R_2$ may be a hydrogen atom or a halogen atom.

Useful olefins are those having the general formula

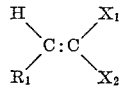

where $R_1$ represents a hydrogen atom or a hydrocarbon radical selected from the group of alkyl and unpolymerizable alkene radicals which may or may not be substituted by halogen, oxygen, nitrogen, etc. atoms, and where $X_1$ and $X_2$ may be an activating atom or radical selected from the group consisting of hydrogen atom, halogen atom, and alkoxy, aryloxy, alkaryloxy groups and acetyl, alkyl, substituted alkyl, alicyclic, substituted alicyclic, aromatic and nuclear hydrogen substituted aromatic radicals.

The preferred form of olefins are those having a single double bond and the general formula

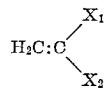

where $X_1$ and $X_2$ are activating atoms of the types described in the general formula above. Such monoolefins are illustrated by the compounds, for example, vinyl halides, vinyl ethers, vinyl acetate, vinyl naphthalene, styrene, alkyl styrenes, and halogen substituted styrenes in which two to five of the nuclear hydrogen atoms are replaced by halogen and the like. The preferred form of resin ingredient is the heteropolymer of styrene and maleic anhydride.

The resin ingredient may contain up to 50 mole percent of the unsaturated dibasic acid anhydride, although the preferred forms contain from 2 to 35 mole percent anhydride. Compositions below 2 percent cannot be as tightly crosslinked while those above 35 percent have poorer color and thermal stability. Most advantageously, the resin contains from 3 to 20 mole percent anhydride.

The polyol crosslinking curing agent may be any polyol having a vapor pressure greater than 200 millimeters of mercury at a temperature of 250° C. The polyol should have less than six hydroxyl groups, and preferably should have 2 or 3 hydroxyl groups. Suitable polyols include the propane, butane, pentane, heptane and hexane diols, the alkyl substituted alkane diols, trihydric alcohols such as methane triols, and polyhydric alcohols such as cyclohexane tetrols and methane tetrols.

The removal of crosslinking agent may be carried out at temperatures of from 100° to 300° C. preferably of 200–250° C. at pressures of less than 760 millimeters of mercury absolute, preferably at pressures of less than 250 millimeters mercury. Where poorer vacuums are used, it may be desirable to purge with an inert gas to prevent contact between oxygen and the hot polymer. Agitation during this step substantially increases the rate of reversal reaction by speeding removal of the crosslinking agent.

The invention is further illustrated by the following examples wherein all parts are by weight unless otherwise specified.

EXAMPLE 1

A granular copolymer containing 90 percent styrene and 10 percent maleic anhydride was mixed with 7 percent butane diol until the granules had a uniform appearing coat of the liquid diol. The mixture was then fed into a Dow plastruder where it was heated to 210° C. at atmospheric pressure. The resulting product was crosslinked as indicated by a swelling ratio and percent gel in toluene of 6.18 and 75.7 percent respectively. When this crosslinked material was ground and passed back through the plastruder at 230° C. and at atmospheric pressure, only a slight reversal of crosslinking took place, the swell ratio increased to 7.82 and the percent gel was 75.71 percent. Subjecting this crosslinked material to both a temperature of 230° C. and less than 100 mm. vacuum however, resulted in a complete reversal of crosslinking as indicated by complete solubility in toluene.

EXAMPLE 2

A styrene/maleic anhydride copolymer containing 10.25 percent maleic anhydride and having a 1.28 centipoise solution viscosity at the 10 weight percent level in MEK at 25° C. was mixed with a variety of polyol curing agents, on the basis of one hydroxyl per anhydride group. The mixing was carried out on a two roll mill heated with 175° C. steam. After mixing, each sample was molded into a ⅛″ thick chip in a compression press and was cured for ½ hour at 350° F. A small piece of this cured chip was accurately weighed and placed in methyl ethyl ketone for 24 hours, after which the nondissolved portion was weighed wet and after drying for one hour at 100° C. at <1 mm. vacuum. The percent insolubility, which is a measure of the extensiveness of the crosslinking was calculated. A one gram sample of this ⅛" thick cured chip was then placed in a vacuum oven at 235° C. for 2 hours with the vacuum maintained at less than 1 mm. Hg. The percent insolubility was measured as before. Reversibility is demonstrated in all cases as a lowering in percent insoluble. The rate of reversal is diffusion controlled and is thus influenced greatly by factors such as vapor pressure of the polyol and agitation as well as the favorable equilibrium instant. The effect of agitation is particularly evident in a previous example using 1,4-butanediol, where reversal of crosslinking was completed during the less than two minute residence time in a plastruder at 230° C. with vacuum of less than 10 mm.

methylimino-diethanol) and subjecting it to agitation heat, and vacuum for an extended period of time. The outlet of a plastruder was blocked and the temperature was raised to 275° C. Rotation of the rolls was started and 100 gms. of the S/10.25 percent MA copolymer used above was added and allowed to melt, then 9.36 gms. of 2,2-methylimino diethanol was added and within 5 minutes the polymer was tightly crosslinked. After about 20 minutes a vacuum was applied. The sample was allowed to mix at 275° C. with a 40 mm. Hg vacuum for about 3½ hours, after which it was found to be completely soluble in methyl ethyl ketone, indicating complete reversal of crosslinking.

TABLE I

| Sample No. | Crosslinking Agent | | Extent of Initial Crosslinking (Cured ½ hr. at 350° F.) | Extent of Crosslinking after Reversal (2 hrs./ 235° C./ 1 mm. Hg.) | Sample Weight, gms. |
|---|---|---|---|---|---|
| | Name | Boiling Point, °C. | Percent Insoluble in Methyl Ethyl Ketone | Percent Insoluble in MEK | |
| 1 | 1,4-butane diol | 228 | 99.72 | 72.2 | 1.13 |
| 2 | Diethylene glycol | 244.8 | 83.23 | (1) | 0.98 |
| 3 | Triethylene gylcol | 285.5 | 89.64 | (1) | 1.07 |
| 4 | Glycerol | 290.0 | 74.3 | (1) | 1.00 |
| 5 | 1,2,4-butane-triol | 312 | 91.8 | 83.5 | 1.08 |
| 6 | Tetraethylene glycol | 314 | 84.51 | (1) | 1.00 |
| 7 | 2,2-diethylene-1,3-propane diol | 125 (10 mm.) | 93.8 | 64.2 | 1.02 |
| 8 | 2,6-dimethylol, 4-methyl phenol | | 80.69 | 63.9 | 1.07 |
| 9 | p-Xylene glycol | 370° F. | 99.28 | 86.1 | 1.07 |

1 Soluble.

EXAMPLE 3

Following the procedure of Example 2, a number of amino alcohols were used to crosslink the copolymer utilized in Example 2. After treatment with MEK for 24 hours the swell ratio (wet weight divided by the dry weight of the insoluble portion) was determined. The swell ratio is a measure of the crosslink density. An increase in the swell ratio is an indication of reversibility. The results are shown in Table II.

Table III shows the operability of a variety of maleic anhydride copolymers within the scope of this invention. The indicated polyol was added as in Table I and the reversibility is shown by a decrease in extent or tightness of crosslinking after subjection to heat and vacuum.

TABLE III

| Sample No. | Maleic Anhydride Copolymer | Crosslinking Agent | Extent of Initial Crosslinking (Cured ½ hr. at 350° F.) | Extent of Crosslinking after Reversal (2 hrs./ 235° C./ 1 mm. Hg. | Sample Weight |
|---|---|---|---|---|---|
| | | | Percent Insoluble in Methyl Ethyl Ketone | Percent Insoluble in MEK | |
| 1 | 55 percent MMA/40 Sty/5 percent MA | Ethylene glycol | 95.87 | 23.4 | 0.61 |
| 2 | Chlorostyrene 111.2 MA | do | 62.77 | 55.0 | 1.49 |
| 3 | Sty/αMS (13.5 percent)/16.5 MA | Butane diol | 46.6 | (1) | 1.31 |

1 Soluble.

Various modifications may be made in the present invention without departing from the spirit or scope thereof, and it is understood that I limit myself only as defined in the appended claims.

TABLE II

| Sample No. | Crosslinking Agent | | Extent of Initial Crosslinking (Cured ½ hr. at 350° F.) | Extent of Crosslinking after Reversal (2 hrs./ 235° C./ 1 mm. Hg. | Sample Weight |
|---|---|---|---|---|---|
| | Name | Boiling Point, °C. | Swell Ratio (by wt. in MEK) | Swell Ratio in MEK | |
| 10 | Butyldiethanolamine | 273 (741 mm.) | 1.53 | 1.78 | 1.08 |
| 11 | 2,2'-methylimino-diethanol | 127 (10 mm.) | 1.36 | 2.09 | 1.01 |
| 12 | Triethanolamine | 175 (5 mm.) | 1.28 | 1.414 | .98 |

The effectiveness of agitation was also shown by taking the much less reversible polyol of Sample 11 (2,2'-

I claim:
1. A process for the removal of crosslinking agent from a polyol crosslinked polymer of (1) an anhydride having the general formula

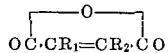

wherein $R_1$ represents hydrogen, halogen or a hydrocarbon radical and $R_2$ is hydrogen or halogen and (2) an ethylenically unsaturated monomer having the general formula

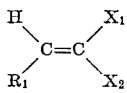

wherein $R_1$ represents hydrogen or a hydrocarbon radical and $X_1$ and $X_2$ are hydrogen, halogen, alkoxy aryloxy, acetyl, alkyl, alicyclic or aromatic radicals, said polyol containing less than six hydroxyl groups and less than about 9 carbon atoms and having a vapor pressure greater than 200 mm. of Hg at a temperature of 250° C. and wherein the ratio of hydroxyl equivalents to anhydride moieties is less than about 1.65 to 1 which comprises heating said crosslinked polymer to a temperature of 100° to 300° C. at a pressure of less than 250 mm. Hg whereby the polyol crosslinking agent is substantially removed.

2. Process of claim 1 wherein the polymer is agitated.

3. Process of claim 1 wherein the temperature is 200 to 250° C.

4. Process of claim 1 wherein the ethylenically unsaturated monomer is a monovinyl or vinylidene aromatic monomer.

5. Process of claim 1 wherein the ethylenically unsaturated monomer is styrene.

6. Process of claim 4 wherein the anhydride is maleic anhydride.

References Cited

UNITED STATES PATENTS

| | | | |
|---|---|---|---|
| 3,085,986 | 4/1963 | Muskat | 260—78.5 |
| 3,277,036 | 10/1966 | Whitworth et al. | 260—78.5 |
| 3,299,184 | 1/1967 | Whitworth et al. | 260—897 |

OTHER REFERENCES

Webster's Third New International Dictionary, unabridged, 1965, page 1571 relied on.

JOSEPH L. SCHOFER, *Primary Examiner.*

J. A. SEIDLECK, *Examiner.*

L. WOLF, J. C. HAIGHT, *Assistant Examiners.*